(12) United States Patent
Chen et al.

(10) Patent No.: US 8,627,302 B2
(45) Date of Patent: Jan. 7, 2014

(54) SAMPLING BASED RUNTIME OPTIMIZER FOR EFFICIENT DEBUGGING OF APPLICATIONS

(75) Inventors: William Y. Chen, Los Altos, CA (US); Jiwei Lu, Pleasanton, CA (US)

(73) Assignee: Oracle America, Inc., Redwood City, CA (US)

( * ) Notice: Subject to any disclaimer, the term of this patent is extended or adjusted under 35 U.S.C. 154(b) by 1509 days.

(21) Appl. No.: 11/945,989

(22) Filed: Nov. 27, 2007

(65) Prior Publication Data

US 2009/0138859 A1    May 28, 2009

(51) Int. Cl.
*G06F 9/44* (2006.01)
*G06F 9/45* (2006.01)

(52) U.S. Cl.
USPC ............ 717/158; 717/124; 717/127; 717/151

(58) Field of Classification Search
None
See application file for complete search history.

(56) References Cited

U.S. PATENT DOCUMENTS

| | | | |
|---|---|---|---|
| 6,622,300 B1* | 9/2003 | Krishnaswamy et al. | 717/151 |
| 6,971,091 B1* | 11/2005 | Arnold et al. | 717/145 |
| 7,058,928 B2* | 6/2006 | Wygodny et al. | 717/127 |
| 7,480,902 B2* | 1/2009 | Patil et al. | 717/158 |
| 7,735,073 B1* | 6/2010 | Kosche et al. | 717/158 |
| 7,770,157 B2* | 8/2010 | Arnold et al. | 717/151 |
| 7,900,201 B1* | 3/2011 | Qureshi et al. | 717/124 |
| 7,954,090 B1* | 5/2011 | Qureshi et al. | 717/127 |
| 7,996,814 B1* | 8/2011 | Qureshi et al. | 717/151 |
| 8,001,527 B1* | 8/2011 | Qureshi et al. | 717/127 |
| 8,181,170 B2* | 5/2012 | Patil et al. | 717/158 |
| 8,214,817 B2* | 7/2012 | Mendelson et al. | 717/158 |
| 8,312,435 B2* | 11/2012 | Wygodny et al. | 717/124 |
| 2002/0087949 A1* | 7/2002 | Golender et al. | 717/124 |
| 2004/0049768 A1* | 3/2004 | Matsuyama et al. | 717/151 |
| 2005/0251792 A1* | 11/2005 | Smith | 717/131 |
| 2006/0010431 A1* | 1/2006 | Patil et al. | 717/151 |
| 2006/0242627 A1* | 10/2006 | Wygodny et al. | 717/128 |
| 2007/0288908 A1* | 12/2007 | Cain et al. | 717/158 |
| 2008/0184209 A1* | 7/2008 | LaFrance-Linden | 717/130 |
| 2009/0133008 A1* | 5/2009 | Patil et al. | 717/158 |
| 2012/0278793 A1* | 11/2012 | Jalan et al. | 717/158 |
| 2013/0061210 A1* | 3/2013 | Chung et al. | 717/124 |

OTHER PUBLICATIONS

Kim Elms; Debugging Optimised Code Using Function Interpretation, 1997; retrieved online on Aug. 22, 2013; pp. 1-10; Retrieved from the Internet: <URL: http://cutebugs.net/files/debugging/elms97debugging.pdf>.*

(Continued)

*Primary Examiner* — Thuy Dao
*Assistant Examiner* — Hanh T Bui
(74) *Attorney, Agent, or Firm* — Martine Penilla Group, LLP

(57) ABSTRACT

A method of reproducing runtime environment for debugging an application includes reading an optimizer file from a non-volatile storage medium. The optimizer file includes a runtime environment, application definition information, and a log. The log includes summaries of events, actions, and a time mark of occurrence for each of the actions. A runtime environment for debugging the application is then defined and the application runtime is set up using the application definition information in the optimizer file. Further, the method includes running the application, attaching an optimizer, and triggering each of the actions to occur at a time mark of occurrence associated with each of the actions. Then, each of the actions and associated events is analyzed by comparing the events produced by running the application with the events in the optimizer file. If a fault is produced by the triggering, a debugger is invoked to analyze the fault.

14 Claims, 4 Drawing Sheets

(56) References Cited

OTHER PUBLICATIONS

Kazunori Ogata et al.; Replay Compilation: Improving Debuggability of a Just-in Time Compiler; 2006; retrieved online on Aug. 22, 2013; pp. 241-251; Retrieved from the Internet: <URL: http://delivery.acm.org/10.1145/1170000/1167493/p241-ogata.pdf?>.*

Yuhei Kawakoya et al., Memory Behavior-Based Automatic Malware Unpacking in Stealth Debugging Environment; 2010; retrieved online on Aug. 22, 2013; pp. 39-46; Retrieved from the Internet: <URL: http://ieeexplore.ieee.org/stamp/stamp.jsp?tp=&arnumber=5665794>.*

* cited by examiner

| Event Summary | Action | Time (instructions executed) |
|---|---|---|
| e1 (50), e2 (70), e3 (20) | A | 700 |
| e4 (150), e5 (27) | B | 1000 |
| e6 (10), e7 (467) | C | 1250 |

SAMPLING BASED RUNTIME OPTIMIZER FOR EFFICIENT DEBUGGING OF APPLICATIONS

BACKGROUND

The present invention generally relates to debugging applications. More particularly, the present invention is directed to efficient debugging of applications by the use of a sampling based runtime optimizer.

Various events are triggered during a runtime of applications in a computing system. Collecting and analyzing these events help in debugging of the applications if a need arises to investigate or reproduce a fault that may have occurred during the application runtime. A fault is not necessarily an explicit runtime error seen by the user, it can be subtle mismatch of a certain micro-processor state that is only visible through system development tools. However, to check every runtime state at each single execution step is time-consuming and often a prohibitive task. Traditionally, performing sampling on hardware performance counters in a computing system is practiced to reduce overhead while maintaining statistical correctness of the measurements. However, there is a drawback of the sampling method. When the sampling rate is below the rate of occurrence of the events, the sampling method fails to capture all the events, thereby preventing reproduction of same runtime environment for debugging. Inconsistency on the support of hardware performance counters across runtime platforms also prevents the same event behavior from being monitored on different runtime platforms.

Thus, there is a need for an event-record and action-reproduce system to assist the sampling-based debugging.

SUMMARY OF THE INVENTION

A sampling based runtime optimizer and methods for efficient debugging of optimized applications are disclosed. Embodiments of the present invention discloses methods of creating optimizer files including a log and using the optimizer file to reproduce a substantially similar debugging environment to reproduce a substantially similar behavior of applications in different runtime and hardware environments.

In one embodiment, a method of event sampling for an application is disclosed. The method includes attaching a runtime optimizer to the application at runtime, running the application, and recording a plurality of events during runtime, the recording of the plurality of events includes capturing an event type for each of the plurality of events. The method further includes recording a plurality of actions, the recording of the plurality of actions includes capturing a time mark at which each of the plurality of actions occurred. The method concludes by creating an optimizer file including the recorded events, actions and time marks for the actions. The optimizer file is stored on a non-volatile storage medium.

In another embodiment, a method of reproducing runtime environment for debugging an application is disclosed. The method includes reading an optimizer file from a non-volatile storage medium. The optimizer file includes a runtime environment, application definition information, and a log. The log includes summaries of a plurality of events, the plurality of actions, and a time mark of occurrence for each of the plurality of actions. The method further includes defining a runtime environment for debugging the application and setting up the application runtime using the application definition information in the optimizer file. Further, the method includes running the application and attaching an optimizer, then triggering each of the plurality of actions to occur at each time mark of occurrence associated with the each of the plurality of actions, and analyzing each of the plurality of actions and the plurality of events associated with the each of the plurality of actions, the analyzing includes comparing the events produced by running the application with the plurality of events in the optimizer file. If a fault is produced by the triggering, a debugger is invoked to analyze the fault.

In yet another embodiment, a computer readable medium having program instructions for reproducing runtime environment for debugging an application is disclosed. The computer readable medium includes program instructions for reading an optimizer file from a non-volatile storage medium. The optimizer file includes a runtime environment, application definition information, and a log. The log includes summaries of a plurality of events, the plurality of actions, and a time mark of occurrence for each of the plurality of actions. The computer readable medium further includes program instructions for defining a runtime environment for debugging the application, the defining uses the runtime environment provided by the optimizer file, program instructions for setting up the application runtime using the application definition information in the optimizer file, and program instructions for running the application and attaching an optimizer. The computer readable medium also includes program instructions for triggering each of the plurality of actions to occur at each time mark of occurrence associated with the each of the plurality of actions, and program instructions for analyzing each of the plurality of actions and the plurality of events associated with the each of the plurality of actions. The analyzing includes comparing the events produced by running the application with the plurality of events in the optimizer file. If a fault is produced by the triggering, a debugger is invoked to analyze the fault.

The advantages of the embodiments of the present invention are numerous. Most notably, the systems and methods described herein provide reproduction of a debugging environment for applications to enable the applications capable of being debugged independent of hardware or software environment.

Other aspects and advantages of the present invention will become apparent from the following detailed description, taken in conjunction with the accompanying drawings, illustrating by way of example the principles of the present invention.

BRIEF DESCRIPTION OF THE DRAWINGS

The present invention can be best understood by reference to the following description taken in conjunction with the accompanying figures, in which like parts may be referred to by like numerals.

Figure 1:
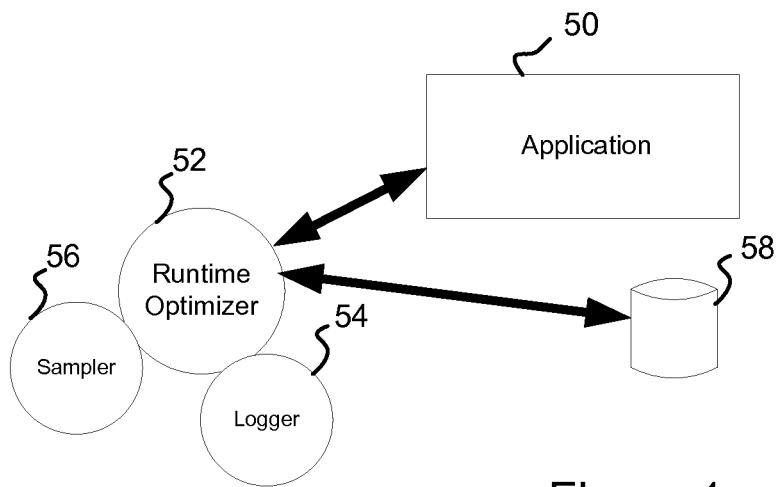
FIG. 1 illustrates a simplified block diagram showing the runtime optimizer attached to an application and in communication with a computer readable media, in accordance with one embodiment of the present invention.

The figures are provided in order to provide a thorough understanding of the present invention. The figures should not be construed as limiting the breath of the invention in any manner.

DETAILED DESCRIPTION OF THE INVENTION

A sampling based runtime optimizer and methods for efficient debugging of applications are disclosed. Embodiments of the present invention discloses methods of creating optimizer files including a log and using the optimizer file to reproduce a substantially similar debugging environment to reproduce a substantially similar behavior of applications in different runtime and hardware environments. While the present invention has been particularly shown and described with reference to the foregoing preferred embodiments, those skilled in the art will understand that many variations may be made therein without departing from the spirit and scope of the invention as defined in the following claims. The scope of the invention should be not therefore, not be limited to the description of the invention; rather, the scope of the invention should be defined by the claims including the full scope of equivalents thereof.

Sampling on hardware performance counter is a powerful tool for reducing overhead while maintaining statistical correctness for most measurements. A runtime optimizer, in one embodiment uses sampling to reduce the overhead of application monitoring. However, there is a drawback to this use of the sampling. It is not possible to reproduce the results when the sampling rate is below the period of occurrence of the events, i.e., sampling is being done slower than occurrence of the events. Further, inconsistencies on the hardware performance counters across platforms also prevent the same event behaviors from being monitored on different micro-architectures. However, reproducibility of the results is necessary when performing effective debugging and testing of the runtime system or application.

In general, debugging is best done on the same system because the new system may have variation in hardware and software settings and these variations can perturb system or application action performance. However, in practice, it is not always possible to use the same system for debugging and fault finding in the application. For example, a customer may report issues with the application execution or performance optimization of the application. However, the vendor of the application and/or system may not be co-located and would want to reproduce the issues on a different system at a remote location.

In one embodiment, the hardware system information, runtime application information, various paths and creation times, execution options, environment variables, and other information that is necessary to run the application being debugged are recorded. Further, time marks of actions along with event types and the frequency of the events that occurred prior to the timestamp of each of the actions are also recorded. The executable name, path and creation time, execution options, and environment variables are used to obtain and re-execute the execution binary. The re-execution can be performed on a different system having different hardware and runtime environment. The hardware system information and timestamps of the occurrence of each of the actions are used to determine when to apply the exact action at a correct time mark during the re-execution so that a reproduction of a substantially similar application runtime can be obtained. The event types and frequency are used to guide the exact action at the approximately same time during the re-execution.

In one embodiment, the time mark is defined as a point in time with respect to a previously occurred point in time. The time mark is represented in terms of milliseconds elapsed since a fixed point in time. In another embodiment, the time mark can be represented in terms of executed instructions since the beginning of the application execution. In yet another embodiment, number of execution cycles since the beginning of the application execution can also be used for representing the time mark. In yet another embodiment, any other scheme can be used to represent the time mark so long as a length of a period between the occurrence of an event or action with respect to a fix point in time can be measured and such scheme is supported by the underlying platform.

The recording of the necessary information allows the runtime results to be reproduced. In addition, a different system that can run the application using the same execution criteria can be used for debugging of the application. This is true even if the new system does not provide hardware performance counters or the performance counters works differently in comparison with the system that was used for initial execution of the application. With this overview in mind, the following figures will illustrate example structure and functionality of sampling based runtime optimizer for efficient debugging of applications.

FIG. 1 illustrates an exemplary block diagram of attaching a runtime optimizer 52 to an application 50. The runtime optimizer 52, in one embodiment, includes a sampler 56 to perform sampling of events and actions and a logger 54 to write the information regarding captured events and actions to an optimizer file. In one embodiment, both the sampler 56 and the logger 54 can be combined in one programming module. A computer readable media 58 is included to store application programming modules, programming modules for sampling and logging, and the optimizer file.

The runtime optimizer 52 provides the application execution optimization. When the application 50 is launched, the runtime optimizer 52 is attached to the application binary executable image in memory. For example, in UNIX and UNIX-like runtime environments, LD_PRELOAD environment variable may be used to attach the runtime optimizer 52 to the application 50. Other runtime environments also provide similar instructions or commands for attaching external libraries or external applications to an application 50 at runtime. The runtime optimizer 52 makes necessary modifications to the executable code to improve application execution performance. The sampler 56 and the logger 54 are invoked to monitor and log system or processor events and actions. Cache miss operations and memory write operations, memory page miss operations and input/output write operations are few examples of processor events. In one embodiment, an action is an application action. In another embodiment, the action is a system action.

Figure 2:
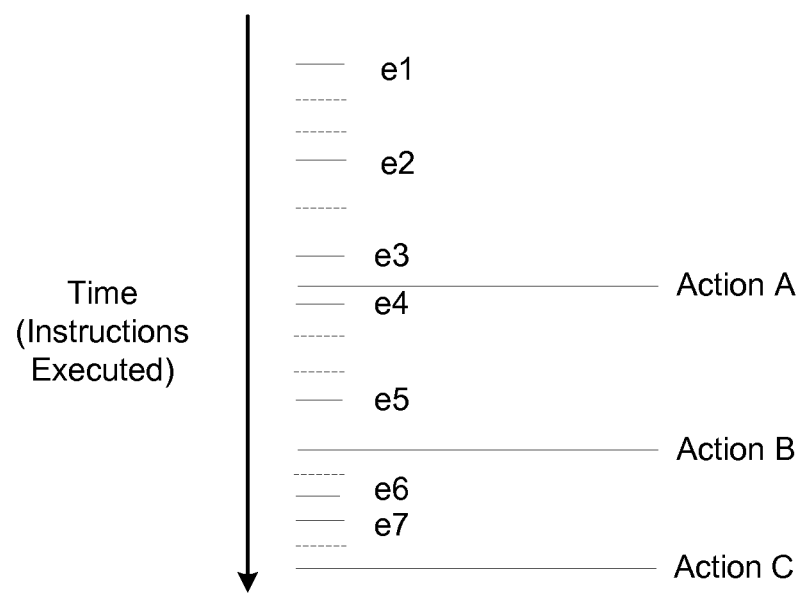
FIG. 2 is a simplified flow diagram illustrating occurrence of events and actions as application instructions execute, in accordance with one embodiment of the present invention

FIG. 2 illustrates a simplified flow of the occurrence of events and actions on a time mark scale. As illustrated exemplarily in FIG. 2, a plurality of events such as e1, e2, e3, etc., occurred before the occurrence of the action A. In one embodiment, the sampler 56 and the logger 54 monitor and record occurrence of both the events and the actions.

Figures 3, 4:
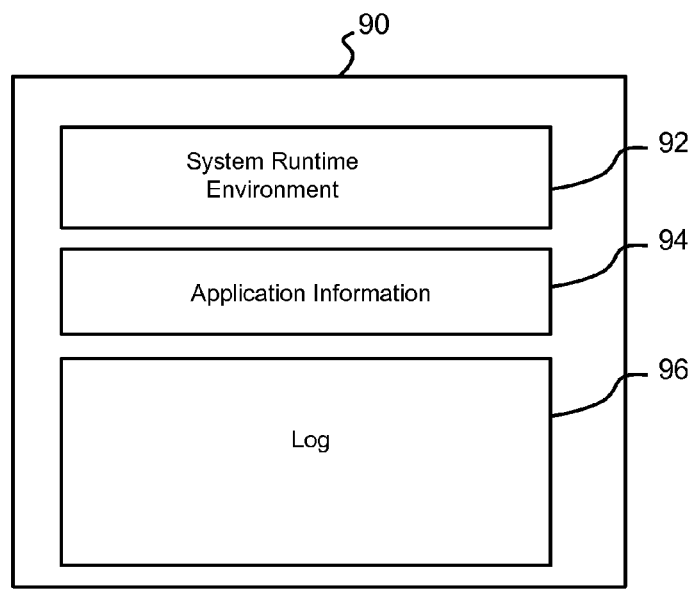
FIG. 3 is a simplified log data illustrating summarized events, actions, and the time marks of occurrence of the actions, in accordance with one embodiment of the present invention.
FIG. 4 is a simplified block diagram representation of an optimizer file created by the optimizer, in accordance with one embodiment of the present invention.

FIG. 3 illustrates an exemplary log data 96 compiled from the occurrence of events. The log data 96 broadly includes event summary 80, action 82, and the time mark of occurrence 84 of actions. The event summary 80, in one embodiment, includes summary of events that occurred before the occurrence of a corresponding action. The summary of events, in one embodiment, includes even types and a number of times a particular event occurred. In other embodiments, other information about the event that could be helpful in recreating or reproducing the event can also be recorded. As illustrated exemplarily, the first row of the log data 96 includes fifty occurrences of event e1, seventy occurrences of event e2, and 20 occurrences of event e3. Further, these events occurred before (or simultaneous) action A, and action A occurred at instruction number 700. The log data 96, in other embodiments, may contain other data that is relevant to the reproduction of the actions and events at or about the time mark of occurrence, on other computer systems.

FIG. 4 illustrates an exemplary structure of the optimizer file 90. The optimizer file 90, in one embodiment, includes system runtime environment information 92, application definition information 94, and log data 96. Runtime environments or operating systems provide specific commands or instructions to retrieve system runtime environment information 92 from a computer system. For example, an operating system or runtime environment provides "env" command to retrieve system environment. Other runtime environments or operating systems also provide similar command or instructions to retrieve or set system runtime environment information 92. The runtime optimizer 52 uses the specific command provided by the runtime environment to retrieve the system runtime environment information 92. In one embodiment, the system runtime environment includes PATH variables to enable loading specific libraries at the reproduction of the system runtime environment. The system runtime environment information 92 includes all information that is necessary to reproduce same or substantially same system runtime environment on a different computer system.

Still referring to FIG. 4, the runtime optimizer 52 also retrieves application definition information 94. The application definition information 94 pertains to the application 50 with which the runtime optimizer 52 is attached at runtime. In one embodiment, the application definition information 94 includes name, version info, security info, input variables, and command line inputs for the application 50. In another embodiment, the application definition information includes all necessary information that is relevant to running the application 50 in a same or similar state on a different computer system. Further, the optimizer file 90 includes the log data 96. The details of the log data have been discussed in FIG. 3. In other embodiments, the optimizer file 90 can include other information that is relevant to the reproduction of runtime environment, application environment, events, and actions so long as the information can be retrieved from the computer system on which the application 50 runs.

Figure 5:
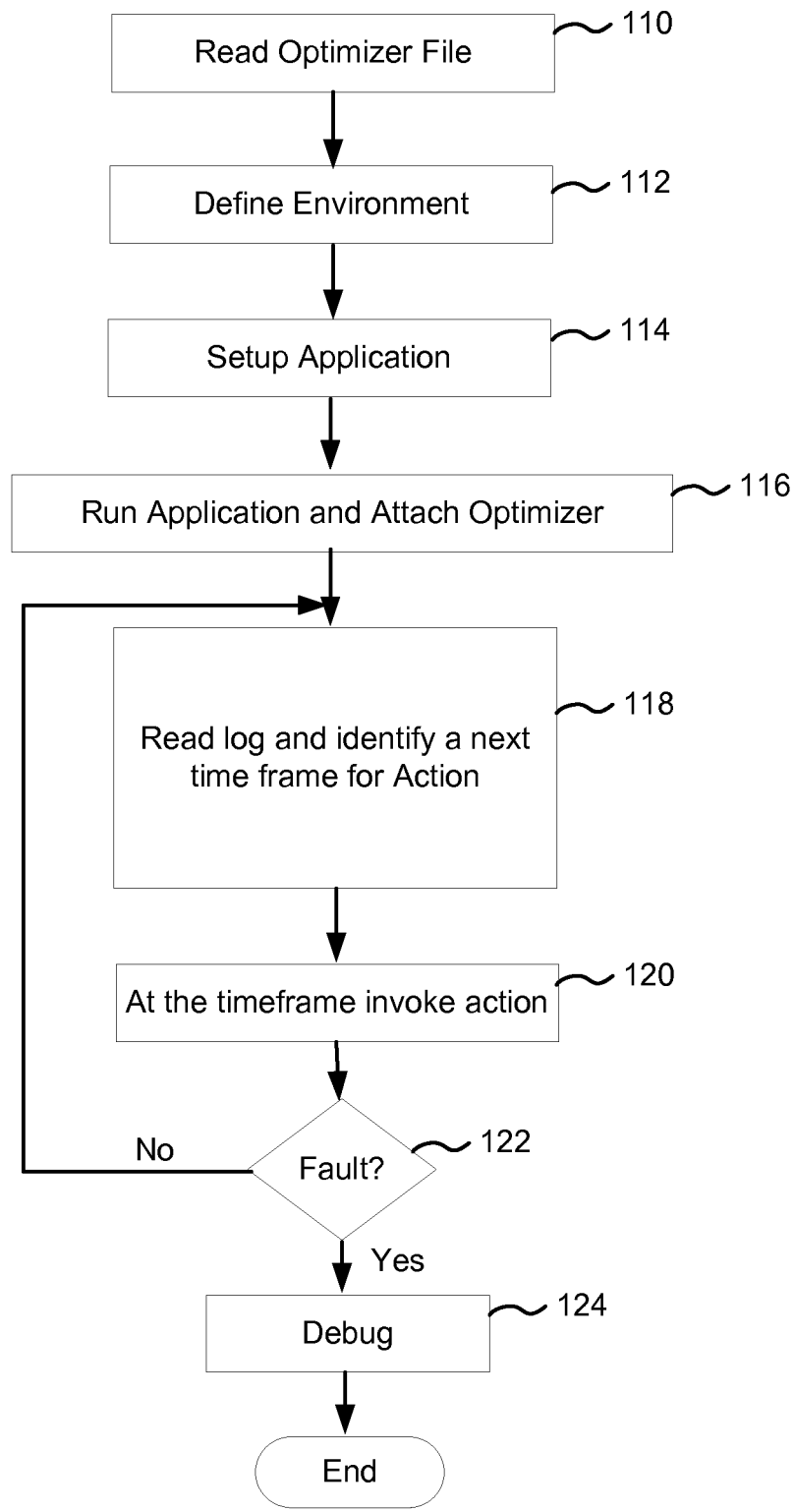
FIG. 5 illustrates a flow diagram of the process of recreating environment for debugging the application based on the data provided by the optimizer file, in accordance with one embodiment of the present invention.

Referring now to FIG. 5 which illustrates a flow diagram of reproduction of the runtime environment, application environment, events, and actions. In one embodiment, the process illustrated in FIG. 5 is performed on computer system that is different from the computer system on which the application 50 previously ran and a fault in the optimization was reported during the execution of the application 50. The flow starts at operation 110 in which the optimizer file 90 is read. The optimizer file is created during a previous run of the application 50 on a different computer system. The system runtime environment information 92 is retrieved from the optimizer file 90 and a same or similar system runtime environment is reproduced using the information included in the system runtime environment information 92. The control then moves to operation 114 in which the application setup is performed using the information provided by the application definition information 94. Then in operation 116, the application 50 is run and the runtime optimizer 52 is attached in a same or similar manner as in the previous run of the application 50 on a different computer system.

Still referring to FIG. 5. The control then moves to operation 118 in which the log information 96 is read from the optimizer file 90. In one embodiment, the entire log information 96 is read and cached in the memory. In other embodiment, the log information 96 is read one row at a time. From the first row of the log information 96, the time mark of the occurrence of the first action is identified. The system waits for that time mark of occurrence of the action and in operation 120, the action is invoked at that time mark. From the time of the attachment of the runtime optimizer 52 to the application 50, all relevant events are monitored. Before the invocation of the action in operation 120, the runtime optimizer 52 ensures that all events that occurred during the previous run of the application 50 and during which time the optimizer file 96 was created including the event summary 80, are forced to occur during the current run of the application 50. Hence, for example if event e1 occurred fifty times during the previous run of the application 50 before action A occurred (see FIG. 3), the runtime optimizer 52 ensures that during the current run of the application 50, event e1 (such as "cache miss") is forced to occur fifty times before action A is invoked in operation 120. The purpose of this method is to ensure the application 50 in its current run is provided with the same or substantially similar runtime environment so as to enable reproduction of faults (because a fault that occurred on one system during one run of the application often times can't be reproduced in another run of the application on same or different system). It may be noted that even though term "different computer system" is being used to illustrate the methods, in another embodiment, the process described herein can also be used to reproduce faults on the same system.

Next, in operation 122, the system checks for an occurrence of a fault. If no fault occurs, the control goes back to operation 118 in which a next row is read from the log information 96. If the fault occurs, a debugger is invoked to debug the application 50 and runtime optimizer 52 code to pinpoint the source of the fault.

Figure 6:
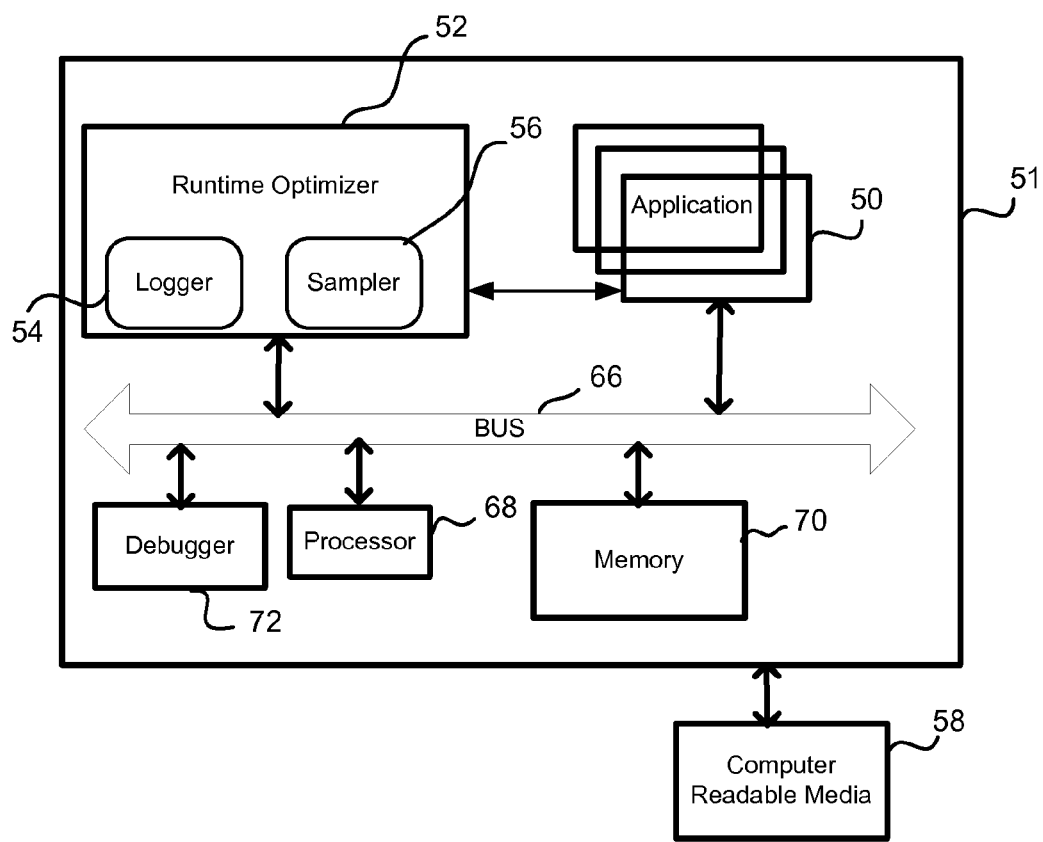
FIG. 6 illustrates an exemplary computer system including the runtime optimizer module, processor, and computer readable media, in accordance with one embodiment of the present invention.

FIG. 6 illustrates an exemplary computer system 51 including the runtime optimizer 52 module including logger 54 module and sampler 56 module. The computer system 51 further includes a runtime environment to run applications 50, a processor 68, a memory 70, and a bus 66 to enable communication and addressing of various modules and components of the computer system 51. The computer system 51 includes an interface to a debugger 72. In one embodiment, the debugger 72 could be included in the computer system 51. The computer system 51 also includes an externally connected computer readable media 58. The externally connected computer readable media, in one embodiment, includes programming instructions of the runtime optimizer 52 including logger 54 and sampler 56. These programming instructions, in one embodiment, can also be stored in the memory 70. The programming instructions when executed by the computer system 51, implements the runtime optimizer 52 including the logger 54 and the sampler 56. In one embodiment, the memory 70 also includes application 50 programming instructions. In one embodiment, the optimizer file 90 is included on the computer readable media 58. In another embodiment, the optimizer file 90 is written to the memory 70 by another computer system that is connected to the computer system 51.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The programming modules, page modules, and, subsystems described in this document can be implemented using a programming language such as Flash, JAVA, C++, C, C#, Visual Basic, JAVA Script, PHP, XML, HTML etc., or a combination of programming languages. Commonly available application programming interface (API) such as HTTP API, XML API and parsers etc. are used in the implementation of the programming modules. As would be known to those skilled in the art that the components and functionality described above and elsewhere in this document may be implemented on any desktop operating system which provides a support for a display screen, such as different versions of Microsoft Windows, Apple Mac, Unix/X-Windows, Linux etc. using any programming language suitable for desktop software development.

The programming modules and ancillary software components, including configuration file or files, along with setup files required for installing the widget dock and related functionality as described in this document, are stored on a computer readable medium. Any computer medium such as a flash drive, a CD-ROM disk, an optical disk, a floppy disk, a hard drive, a shared drive, and an storage suitable for providing downloads from connected computers, could be used for storing the programming modules and ancillary software components. It would be known to a person skilled in the art that any storage medium could be used for storing these software components so long as the storage medium can be read by a computer system.

The invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

While this invention has been described in terms of several preferable embodiments, it will be appreciated that those skilled in the art upon reading the specifications and studying the drawings will realize various alternation, additions, permutations and equivalents thereof. It is therefore intended that the present invention includes all such alterations, additions, permutations, and equivalents as fall within the true spirit and scope of the invention.

What is claimed is:

1. A method of event sampling for an application, comprising:
   attaching a runtime optimizer to the application at runtime;
   running the application on a first computer having a runtime environment;
   recording a plurality of events during runtime, the recording of the plurality of events includes capturing an event type and number of occurrences for each of the plurality of events;
   recording a plurality of actions, the recording of the plurality of actions includes capturing a time mark at which each of the plurality of actions occurred; and
   creating an optimizer file including the recorded events, actions and time marks for the actions, wherein creating the optimizer file includes providing in the optimization file environment variables of the runtime environment of the first computer on which the application was run;
   reading the optimizer file to reproduce the runtime environment on a second computer system that is different from the first computer system;
   running the application for debugging on the second computer using the runtime environment and the time marks for the actions obtained from the optimizer file, the running of the application for debugging being executed using the second computer system without using performance counters of the second computer system, the optimizer file being stored on a non-volatile storage medium
   wherein the optimizer file includes an application definition information, and a log, the log includes summaries of the plurality of events and the plurality of actions.

2. The method as recited in claim 1, wherein creating of the optimizer file further includes summarizing each of the plurality of events and associating each of the plurality of events with one of the plurality of actions, the one of the plurality of action occurred after the each of the plurality of events.

3. The method as recited in claim 1, wherein each of the plurality of action is one of a user action or a system action.

4. The method as recited in claim 1, wherein the time mark being defined as a number of executed instructions counted from a fix point in time.

5. The method as recited in claim 1 wherein creating of the optimizer file further includes retrieving an application definition information from the runtime environment.

6. The method as recited in claim 1, wherein attaching a runtime optimizer includes invoking a sampler to capture of the plurality of events.

7. The method as recited in claim 6, wherein attaching a runtime optimizer further includes invoking a logger to store of the plurality of events and the plurality of actions.

8. A method of reproducing runtime environment for debugging an application, comprising:
  reading an optimizer file from a non-volatile storage medium, the optimizer file includes a runtime environment of a first computer system, an application definition information, and a log, the log includes summaries of a plurality of events including an event type and number of occurrences for each of the plurality of events, the plurality of actions, and a time mark of occurrence for each of the plurality of actions;
  defining a runtime environment for debugging the application, the defining uses the runtime environment provided by the optimizer file;
  setting up the application runtime on a second computer system that is different than the first computer system using the application definition information in the optimizer file;
  running the application and attaching an optimizer;
  triggering each of the plurality of actions to occur at each time mark of occurrence associated with each of the plurality of actions, wherein using the time marks in the optimizer file enable the triggering of each of the plurality of actions on the second computer without using timing from performance counters of the second computer system; and
  analyzing each of the plurality of actions and the plurality of events associated with the each of the plurality of actions, the analyzing includes comparing the events produced by running the application with the plurality of events in the optimizer file,
  wherein, if a fault is produced by the triggering, a debugger is invoked to analyze the fault;
  wherein producing the fault further includes forcing the each of the plurality of events to occur as many times as described in the summaries of the plurality of events while waiting for the time mark of occurrence for the each of the plurality of actions.

9. The method as recited in claim 8, wherein producing the fault further includes invoking the each of the plurality of actions at the time mark of occurrence for the each of the plurality of actions, if a fault occurs, invoking a debugger to debug the application.

10. A non-transitory computer readable medium having program instructions for reproducing runtime environment for debugging an application, the computer readable medium comprising:
  program instructions for reading an optimizer file from a non-volatile storage medium, the optimizer file includes a runtime environment of a first computer system, an application definition information, and a log, the log includes summaries of a plurality of events including an event type and number of occurrences for each of the plurality of events, the plurality of actions, and a time mark of occurrence for each of the plurality of actions;
  program instructions for defining a runtime environment for debugging the application, the defining uses the runtime environment provided by the optimizer file;
  program instructions for setting up the application runtime on a second computer system that is different than the first computer system using the application definition information in the optimizer file;
  program instructions for running the application and attaching an optimizer;
  program instructions for triggering each of the plurality of actions to occur at each time mark of occurrence associated with the each of the plurality of actions, wherein using the time marks in the optimizer file enable the triggering of each of the plurality of actions on the second computer without using timing from performance counters of the second computer system; and
  program instructions for analyzing each of the plurality of actions and the plurality of events associated with the each of the plurality of actions, the analyzing includes comparing the events produced by running the application with the plurality of events in the optimizer file, wherein, if a fault is produced by the triggering, a debugger is invoked to analyze the fault, wherein the program instructions for producing the fault further includes program instructions for forcing the each of the plurality of events to occur as many times as described in the summaries of the plurality of events during the waiting for the time mark of occurrence for the each of the plurality of actions.

11. The computer readable medium as recited in claim 10, wherein the program instructions for producing the fault includes program instructions for reading each of the plurality of actions from the summaries of the plurality of events in the log.

12. The computer readable medium as recited in claim 11, wherein the program instructions for producing the fault further includes program instructions for reading the time mark of occurrence for the each of the plurality of actions.

13. The computer readable medium as recited in claim 12, wherein the program instructions for producing the fault further includes program instructions for waiting for the time mark of occurrence for the each of the plurality of actions.

14. The computer readable medium as recited in claim 10, wherein the program instructions for producing the fault further includes program instructions for invoking the each of the plurality of actions at the time mark of occurrence for the each of the plurality of actions, if a fault occurs, invoking a debugger to debug the application.

* * * * *